United States Patent
Segall et al.

(10) Patent No.: US 11,134,705 B2
(45) Date of Patent: Oct. 5, 2021

(54) PH ADJUSTED PULSE PROTEIN PRODUCT

(71) Applicant: BURCON NUTRASCIENCE (MB) CORP., Winnipeg (CA)

(72) Inventors: Kevin I. Segall, Winnipeg (CA); Martin Schweizer, Winnipeg (CA)

(*) Notice: Subject to any disclaimer, the term of this patent is extended or adjusted under 35 U.S.C. 154(b) by 405 days.

(21) Appl. No.: 15/006,312

(22) Filed: Jan. 26, 2016

(65) Prior Publication Data

US 2016/0135482 A1    May 19, 2016

Related U.S. Application Data

(63) Continuation-in-part of application No. 14/983,353, filed on Dec. 29, 2015, now abandoned, which is a continuation of application No. 13/937,266, filed on Jul. 9, 2013, now abandoned.

(60) Provisional application No. 61/669,845, filed on Jul. 10, 2012.

(51) Int. Cl.
| | | |
|---|---|---|
| A23J 1/14 | (2006.01) | |
| A23J 3/14 | (2006.01) | |
| A23L 2/66 | (2006.01) | |
| A23L 33/185 | (2016.01) | |
| A23L 13/40 | (2016.01) | |
| A21D 2/26 | (2006.01) | |
| A21D 13/064 | (2017.01) | |
| A23C 9/152 | (2006.01) | |
| A23C 11/06 | (2006.01) | |

(52) U.S. Cl.
CPC .......... *A23J 1/14* (2013.01); *A21D 2/266* (2013.01); *A21D 13/064* (2013.01); *A23C 9/152* (2013.01); *A23C 11/06* (2013.01); *A23J 1/142* (2013.01); *A23J 3/14* (2013.01); *A23L 2/66* (2013.01); *A23L 13/426* (2016.08); *A23L 33/185* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 2004/0166203 A1* | 8/2004 | Gautam | ............... | A23J 3/08 426/74 |
| 2011/0274797 A1* | 11/2011 | Segall | ............... | A23J 1/14 426/253 |

FOREIGN PATENT DOCUMENTS

WO    WO 2011/075850    *    6/2011

OTHER PUBLICATIONS

Fredrikson et al., "Production Process for High-Quality Pea-Protein Isolate with Low Content of Oligosaccharides and Phytate"—J. Agric. Food Chem. 2001, 49, pp. 1208-1212. (Year: 2001).*
Sumner et al., "Production and Evaluation of Pea Protein Isolate", Journal of Food Science, vol. 46, (1981), pp. 364-372. (Year: 1981).*
Carnovale et al., Phytic Acid in Faba Bean and Pea: Effect on Protein Availability, Cereal Chem, 65(2), 1988, pp. 114-117. (Year: 1988).*
Roland. W.S.U. et al, Flavour Aspects of Pulse Ingredients, Cereal Chemistry, 94(1):58-65.
Renkoski. K., The pros and cons of pea protein in bakery products, BakingBusiness.com, Jan. 30, 2019.
Grebow, J., Pea protein's off notes solved in many ways, IFT exhibitors say, Nutritional Outlook, Aug. 2, 2018.
Gelski, J., Eliminating the pea flavour in pea protein, Food Business News, Feb. 21, 2018.
No author (editorial), Roquette Succeed in Optimising Pea Protein Product, nutrition insight, May 4, 2010.
Halliday, J. in Lestrum, New pea protein process aims to grow market. FoodNavigator.com, Apr. 27, 2010, last updated on Apr. 28, 2010.
Hongsoongnern, P. and Chambers, E. A Lexicon for Green Odor or Flavor and Characteristics of Chemicals Associated with Green, Journal of Sensory Studies, Apr. 1, 2008.

* cited by examiner

*Primary Examiner* — Elizabeth Gwartney

(57) ABSTRACT

An aqueous solution of a pulse protein product having a protein content of at least about 60 wt % (N×6.25) d.b. which is soluble in aqueous media at a pH of less than about 4.4 and heat stable at that pH range is adjusted in pH to a pH of about 6 to about 8. The resulting product is further processed by drying the product, recovering and drying any precipitated pulse protein material, heat treating and then drying the product, or heat treating the product and recovering and drying any precipitated pulse protein material.

6 Claims, No Drawings

PH ADJUSTED PULSE PROTEIN PRODUCT

REFERENCE TO RELATED APPLICATION

This application is a continuation-in-part application of U.S. patent application Ser. No. 14/989,353 filed Dec. 29, 2015 which itself is a continuation of U.S. patent application Ser. No. 13/937,266 filed Jul. 9, 2013 which claims priority under 35 USC 119(e) from U.S. Provisional Patent Application No. 61/669,845 filed Jul. 10, 2012.

FIELD OF INVENTION

The present invention relates to pH-adjusted pulse protein products, preferably isolates.

BACKGROUND TO THE INVENTION

In U.S. patent application Ser. No. 13/103,528 filed May 9, 2011 (US Patent Application Publication No. 2011/0274797 published Nov. 10, 2011), Ser. No. 13/289,264 filed Nov. 4, 2011 (US Patent Application Publication No. 2012/013117 published May 31, 2012), Ser. No. 13/556,357 filed Jul. 24, 2012 (U.S. Patent Application Publication No. 2013/0189408 published Jul. 25, 2013) and Ser. No. 13/642,003 filed Jan. 7, 2013 (U.S. Patent Publication No. 2013/0129901 published May 23, 2013) assigned to the assignee hereof and the disclosures of which are incorporated herein by reference, there is described the provision of pulse protein products having a protein content of at least about 60 wt %, preferably at least about 90 wt % (N×6.25) d.b.

The pulse protein product is formed by a method which comprises:

(a) extracting a pulse protein source with an aqueous calcium salt solution, preferably an aqueous calcium chloride solution, to cause solubilization of pulse protein from the protein source and to form an aqueous pulse protein solution, (b) separating the aqueous pulse protein solution from residual pulse protein source, (c) optionally diluting the aqueous pulse protein solution, (d) adjusting the pH of the aqueous pulse protein solution to a pH of about 1.5 to about 4.4, preferably about 2 to about 4, to produce an acidified pulse protein solution, (e) optionally clarifying the acidified pulse protein solution if it is not already clear, (f) alternatively from steps (b) to (e), optionally, diluting and then adjusting the pH of the combined aqueous pulse protein solution and residual pulse protein source to a pH of about 1.5 to about 4.4, preferably about 2 to about 4, then separating the acidified, preferably clear, pulse protein solution from residual pulse protein source, (g) optionally concentrating the acidified aqueous pulse protein solution while maintaining the ionic strength substantially constant by a selective membrane technique, (h) optionally diafiltering the concentrated pulse protein solution, and (i) optionally drying the concentrated and optionally diafiltered pulse protein solution.

One of the important attributes of the pulse protein products produced in the above-noted US Patent Applications is the clean flavour of the products, in contrast to conventional pulse protein products which possess characteristic green and/or beany and/or vegetable flavours.

The pulse protein products produced in the above-noted US Patent Application, when dissolved in water yield a solution with a low pH. While desirable for acidic food applications, such as the production of acidic beverages, the low pH of the pulse protein products may not be ideal for other food applications, for example, foods having a neutral or near neutral pH. Rather than formulating with an acid protein ingredient and adding other ingredients to increase the pH to the desired level, it may be preferable to utilize the protein product already in a neutral or near neutral form. Commercial pulse protein products are commonly provided at neutral or near neutral pH.

SUMMARY OF THE INVENTION

In accordance with the present invention, the optionally concentrated and optionally diafiltered aqueous protein solution resulting from the aforementioned U.S. patent application Ser. Nos. 13/103,528, 13/289,264, 13/556,357 and 13/642,003 or a solution prepared by rehydrating dried pulse protein product from the process of the aforementioned U.S. patent application Ser. Nos. 13/103,528, 13/289,264, 13/556,357 and 13/642,003 is adjusted to a pH in the range of about 6 to about 8, preferably about 6.5 to about 7.5 and either the resulting product is dried or any precipitate which forms is separated and dried. Alternatively, following pH adjustment to a pH of about 6 to about 8, the pH adjusted solution may be heat treated and then the resulting product dried or any precipitate which forms is separated and dried. The heat treatment step serves to modify the functional properties of the protein product, namely lowering the solubility of the protein and increasing the water binding capacity of the material. The pulse protein products provided herein have a clean flavour and are useful in food applications under neutral or near neutral conditions.

Although a range of commercial pulse protein products are available for food use, with a variety of functional properties, and a variety of intended applications, some of the more common applications for commercial pulse protein products are processed meat products, baked goods and nutrition bars. The pH adjusted pulse protein products of the present invention have a cleaner flavour than conventional pulse protein products and can replace the conventional pulse protein products in various food products, including the types mentioned above, to provide food products having improved flavour.

The pH adjusted pulse protein products of the present invention are also highly useful in food and beverage applications having a pH of between about 6 and about 8 such as dairy analogue products, dairy alternative products and products that are dairy/plant ingredient blends. The pH adjusted pulse protein products of the present invention are particularly useful in dairy analogue or dairy alternative beverages which are formulated and prepared to have organoleptic and/or nutritional properties similar to cow's milk. Such beverages are typically prepared at a pH of about 7 to about 7.5, typically contain protein, optionally contain fat which is stabilized against separation by a homogenization step and optionally contain added vitamins and minerals. The acidic pulse protein product prepared by the process of the aforementioned U.S. patent application Ser. Nos. 13/103,528, 13/289,264, 13/556,357 and 13/642,003 may also be utilized in such dairy analogue or dairy alternative beverages, but use of the product of the present invention offers the advantage that either a pH adjustment step is not required in the preparation of the beverage or that the degree of pH adjustment is minimized.

Accordingly, in an aspect of the present invention, there is provided a method of producing the pulse protein product, which comprises:
- (a) providing an aqueous solution of a pulse protein product having a protein content of at least about 60 wt % (N×6.25) d.b. which is completely soluble in aqueous media at a pH of less than about 4.4 and heat stable at that pH range,
- (b) adjusting the pH of the solution to about pH 6 to about 8, preferably about 6.5 to about 7.5 and
- (c) optionally drying the entire pH adjusted solution, or
- (d) optionally recovering and then drying any precipitated pulse protein material, or
- (e) optionally heat treating the pH-adjusted solution and then drying the entire heat-treated solution, or
- (f) optionally heat treating the pH-adjusted solution then recovering and drying any precipitated pulse protein material.

In another aspect of the present invention, the pulse protein solution produced according to the procedure of above-noted US Patent Applications may be processed to produce the pH-adjusted pulse protein products provided herein. Accordingly, in a further aspect of the present invention, there is provided a method of producing the pulse protein product, which comprises:
- (a) extracting a pulse protein source with an aqueous calcium salt solution, particularly calcium chloride solution, to cause solubilization of pulse protein from the protein source and to form an aqueous pulse protein solution,
- (b) separating the aqueous pulse protein solution from residual pulse protein source,
- (c) optionally diluting the aqueous pulse protein solution,
- (d) adjusting the pH of the aqueous pulse protein solution to a pH of about 1.5 to about 4.4, preferably about 2 to about 4, to produce an acidified aqueous pulse protein solution,
- (e) optionally heat treating the acidified aqueous pulse protein solution to reduce the activity of anti-nutritional trypsin inhibitors and the microbial load,
- (f) optionally concentrating the acidified aqueous pulse protein solution while maintaining the ionic strength substantially constant by using a selective membrane technique,
- (g) optionally diafiltering the concentrated pulse protein solution,
- (h) optionally pasteurizing the concentrated pulse protein solution to reduce the microbial load,
- (i) adjusting the pH of the aqueous pulse protein solution to about pH 6 to about 8, preferably about 6.5 to about 7.5 and optionally drying the entire pH-adjusted solution or
  - optionally recovering and drying any precipitated pulse protein material or
  - optionally heat treating the pH-adjusted solution and then drying the entire heat-treated solution or
  - optionally heat treating the pH-adjusted solution and then recovering and drying any precipitated pulse protein material.

The heat treatment of the pH-adjusted solution generally is effected at a temperature of about 70° to about 160° C. for about 2 seconds to about 60 minutes, preferably about 80° to about 120° C. for about 15 seconds to about 15 minutes, more preferably about 85° to about 95° C. for about 1 to about 5 minutes.

Providing the pulse protein product with a neutral pH of about 6 to about 8 facilitates the use of the product in applications having neutral or near neutral pH, eliminating the need to include in the application formulation, pH elevating ingredients to counteract the low pH of the pulse protein product. The pulse protein products presented herein have a clean flavour and are useful in food applications under neutral or near neutral conditions.

The process options described in the present application allow the production of pulse protein products with a range of functional properties, increasing the utility of the pH adjusted pulse protein product as a food ingredient and as a substitute for conventional pulse protein ingredients.

While the present invention refers mainly to the production and use of pulse protein isolates having a protein content of at least about 90 wt % (N×6.25) on a dry weight basis (d.b.), preferably at least about 100 wt %, it is contemplated that pulse protein products of lesser purity may be provided and used having similar properties to the pulse protein isolate. Such lesser purity products may have a protein concentration of at least about 60 wt % (N×6.25) d.b.

The pulse protein products provided herein are novel. Accordingly, in another aspect of the present invention, there is provided a pulse protein product having a protein content of at least about 60 wt %, preferably at least about 90 wt %, more preferably at least about 100 wt %, (N×6.25) on a dry weight basis (d.b.) having a natural pH in aqueous solution of about 6 to about 8, preferably about 6.5 to about 7.5 and which lacks the characteristic flavours of current commercial pulse protein products. The invention includes a food composition comprising the pulse protein product provided herein.

In another aspect of the present invention, the pulse protein product having a protein content of at least about 60 wt % (N×6.25) d.b., with a natural pH in aqueous solution of about 6 to about 8 and which has a clean flavour has a phytic acid content of less than about 1.5 wt %, preferably less than about 0.5 wt %.

In another aspect of the present invention, there is provided a pulse protein product having a protein content of at least about 60 wt % (N×6.25) d.b., having a molecular weight profile, determined by the method described in Example 15, which is:
- about 16 to about 38 wt %, preferably between about 21 to about 33% greater than about 100,000 Da
- about 20 to about 55 wt %, preferably between about 25 to about 50% from about 15,000 to about 100,000 Da
- about 6 to about 42 wt %, preferably between about 11 to about 37% from about 5,000 to about 15,000 Da
- about 6 to about 23 wt %, preferably between about 11 to about 18% from about 1,000 to about 5,000 Da In another aspect of the present invention, there is provided a pulse protein product having a protein content of at least about 60 wt % (N×6.25) d.b., with a natural pH in aqueous solution of about 6 to about 8, having colorimeter readings for a solution thereof in water, prepared by dissolving sufficient pulse protein product to supply 3.2 g of protein per 100 ml of water used, which are a combination of $L^*$=about 30 to about 60, $a^*$=about 1 to about 7.5 and $b^*$=about 20 to about 33.

In another aspect of the present invention, there is provided a pulse protein product having a protein content of at least about 60 wt % (N×6.25) d.b., having a viscosity reading for a 10% protein w/w solution thereof in water, which is less than about 30 cP, as determined by the method described in Example 17.

The pulse protein product produced according to the process herein lacks the characteristic green and/or beany and/or vegetable flavours of current commercial pulse protein products and is suitable for use in a wide variety of conventional applications of protein products, including but not limited to protein fortification of processed foods and beverages, emulsification of oils, as a body former in baked goods and foaming agent in products which entrap gases. In addition, the pulse protein product may be formed into protein fibers, useful in meat analogs and may be used as an egg white substitute or extender in food products where egg white is used as a binder. The pulse protein product may also be used in nutritional supplements. The pulse protein product may also be used in dairy analogue or dairy alternative products or products that are dairy/plant ingredient blends. Other uses of the pulse protein product are in pet foods, animal feed and in industrial and cosmetic applications and in personal care products.

General Description of Invention

The initial step of the process of providing the pulse protein products involves solubilizing pulse protein from a pulse protein source. The pulses to which the invention may be applied include, but are not limited to lentils, chickpeas, dry peas and dry beans. The pulse protein source may be pulses or any pulse product or by-product derived from the processing of pulses. For example, the pulse protein source may be a flour prepared by grinding an optionally dehulled pulse. As another example, the pulse protein source may be a protein-rich pulse fraction formed by dehulling and grinding a pulse and then air classifying the dehulled and ground material into starch-rich and protein-rich fractions. The pulse protein product recovered from the pulse protein source may be the protein naturally occurring in pulses or the proteinaceous material may be a protein modified by genetic manipulation but possessing characteristic hydrophobic and polar properties of the natural protein.

Protein solubilization from the pulse protein source material is effected most conveniently using calcium chloride solution, although solutions of other calcium salts, may be used. In addition, other alkaline earth metal compounds may be used, such as magnesium salts. Further, extraction of the pulse protein from the pulse protein source may be effected using calcium salt solution in combination with another salt solution, such as sodium chloride. Additionally, extraction of the pulse protein from the pulse protein source may be effected using water or other salt solution, such as sodium chloride, with calcium salt subsequently being added to the aqueous pulse protein solution produced in the extraction step. Precipitate formed upon addition of the calcium salt is removed prior to subsequent processing.

As the concentration of the calcium salt solution increases, the degree of solubilization of protein from the pulse protein source initially increases until a maximum value is achieved. Any subsequent increase in salt concentration does not increase the total protein solubilized. The concentration of calcium salt solution which causes maximum protein solubilization varies depending on the salt concerned. It is usually preferred to utilize a concentration value less than about 1.0 M, and more preferably a value of about 0.10 to about 0.15 M.

In a batch process, the salt solubilization of the protein is effected at a temperature of from about 1° to about 100° C., preferably about 15° C. to about 65° C., more preferably about 20° to about 35° C., preferably accompanied by agitation to decrease the solubilization time, which is usually about 1 to about 60 minutes. It is preferred to effect the solubilization to extract substantially as much protein from the pulse protein source as is practicable, so as to provide an overall high product yield.

In a continuous process, the extraction of the protein from the pulse protein source is carried out in any manner consistent with effecting a continuous extraction of protein from the pulse protein source. In one embodiment, the pulse protein source is continuously mixed with the calcium salt solution and the mixture is conveyed through a pipe or conduit having a length and at a flow rate for a residence time sufficient to effect the desired extraction in accordance with the parameters described herein. In such a continuous procedure, the salt solubilization step is effected in a time of about 1 minute to about 60 minutes, preferably to effect solubilization to extract substantially as much protein from the pulse protein source as is practicable. The solubilization in the continuous procedure is effected at temperatures between about 1° and about 100° C., preferably between about 15° C. and about 65° C., more preferably between about 20° and about 35° C.

The extraction is generally conducted at a pH of about 4.5 to about 11, preferably about 5 to about 7. The pH of the extraction system (pulse protein source and calcium salt solution) may be adjusted to any desired value within the range of about 4.5 to about 11 for use in the extraction step by the use of any convenient food grade acid, usually hydrochloric acid or phosphoric acid, or food grade alkali, usually sodium hydroxide, as required.

The concentration of pulse protein source in the calcium salt solution during the solubilization step may vary widely. Typical concentration values are about 5 to about 15% w/v.

The protein extraction step with the aqueous salt solution has the additional effect of solubilizing fats which may be present in the pulse protein source, which then results in the fats being present in the aqueous phase.

The protein solution resulting from the extraction step generally has a protein concentration of about 5 to about 50 g/L, preferably about 10 to about 50 g/L.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit oxidation of any phenolics in the protein solution.

The aqueous phase resulting from the extraction step then may be separated from the residual pulse protein source, in any convenient manner, such as by employing a decanter centrifuge, followed by disc centrifugation and/or filtration, to remove residual pulse protein source material. The separation step may be conducted at any temperature within the range of about 1° to about 100° C., preferably about 15° to about 65° C., more preferably about 50° to about 60° C. Alternatively, the optional dilution and acidification steps described below may be applied to the mixture of aqueous pulse protein solution and residual pulse protein source, with subsequent removal of the residual pulse protein source material by the separation step described above. The separated residual pulse protein source may be dried for disposal or further processed, such as to recover starch and/or residual protein. Residual protein may be recovered by re-extracting the separated residual pulse protein source with fresh calcium salt solution and the protein solution yielded upon clarification combined with the initial protein solution for further processing as described below. Alternatively, the separated residual pulse protein source may be processed by a conventional isoelectric precipitation process or any other convenient procedure to recover residual protein.

The aqueous pulse protein solution may be treated with an anti-foamer, such as any suitable food-grade, non-silicone based anti-foamer, to reduce the volume of foam formed upon further processing. The quantity of anti-foamer employed is generally greater than about 0.0003% w/v. Alternatively, the anti-foamer in the quantity described may be added in the extraction steps.

The separated aqueous pulse protein solution may be subject to a defatting operation, if required, as described in U.S. Pat. Nos. 5,844,086 and 6,005,076, assigned to the assignee hereof and the disclosures of which are incorporated herein by reference. Alternatively, defatting of the separated aqueous pulse protein solution may be achieved by any other convenient procedure.

The aqueous pulse protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the pulse protein solution by any convenient means, such as by filtration.

The resulting aqueous pulse protein solution may be diluted with water generally with about 0.1 to about 10 volumes, preferably about 0.5 to about 2 volumes, in order to decrease the conductivity of the aqueous pulse protein solution to a value of generally below about 105 mS, preferably about 4 to about 21 mS. Such dilution is usually effected using water, although dilute salt solutions, such as sodium chloride or calcium chloride, having a conductivity up to about 3 mS, may be used.

The water with which the pulse protein solution is mixed generally has the same temperature as the pulse protein solution, but the water may have a temperature of about 1° to about 100° C., preferably about 15° to about 65° C., more preferably about 50° to about 60° C.

The optionally diluted pulse protein solution then is adjusted in pH to a value of about 1.5 to about 4.4, preferably about 2 to about 4, by the addition of any suitable food grade acid, such as hydrochloric acid or phosphoric acid, to result in an acidified aqueous pulse protein solution, preferably a clear acidified aqueous pulse protein solution. The acidified aqueous pulse protein solution has a conductivity of generally below about 110 mS for a diluted pulse protein solution, or generally below about 115 mS for an undiluted pulse protein solution, in both cases preferably about 4 to about 26 mS.

As mentioned above, as an alternative to the earlier separation of the residual pulse protein source, the aqueous pulse protein solution and the residual pulse protein source material, may be optionally diluted and acidified together and then the acidified aqueous pulse protein solution is clarified and separated from the residual pulse protein source material by any convenient technique as discussed above. The acidified aqueous pulse protein solution may optionally be defatted, optionally treated with an adsorbent and optionally treated with defoamer as described above.

The acidified aqueous pulse protein solution may be subjected to a heat treatment to inactivate heat labile anti-nutritional factors, such as trypsin inhibitors, present in such solution as a result of extraction from the pulse protein source material during the extraction step. Such a heating step also provides the additional benefit of reducing the microbial load. Generally, the protein solution is heated to a temperature of about 70° to about 160° C., preferably about 80° to about 120° C., more preferably about 85° to about 95° C., for about 10 seconds to about 60 minutes, preferably about 10 seconds to about 5 minutes, more preferably about 30 seconds to about 5 minutes. The heat treated acidified pulse protein solution then may be cooled for further processing as described below, to a temperature of about 2° to about 65° C., preferably about 50° C. to about 60° C.

If the optionally diluted, acidified and optionally heat treated pulse protein solution is not transparent it may be clarified by any convenient procedure, such as filtration or centrifugation.

The resulting acidified aqueous pulse protein solution may be adjusted to a pH of about 6 to about 8, preferably about 6.5 to about 7.5, as described below, optionally further processed as described below and then dried to produce a pulse protein product. In order to provide a pulse protein product having a decreased impurities content and a reduced salt content, such as a pulse protein isolate, the acidified aqueous pulse protein solution may be processed prior to the pH adjustment step.

The acidified aqueous pulse protein solution may be concentrated to increase the protein concentration thereof while maintaining the ionic strength thereof substantially constant. Such concentration generally is effected to provide a concentrated pulse protein solution having a protein concentration of about 50 to about 300 g/L, preferably about 100 to about 200 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 1,000 to about 1,000,000 Daltons, preferably about 1,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the salt but also low molecular weight materials extracted from the source material, such as carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The concentrated pulse protein solution then may be subjected to a diafiltration step using water or a dilute saline solution. The diafiltration solution may be at its natural pH or at a pH equal to that of the protein solution being diafiltered or at any pH value in between. Such diafiltration may be effected using from about 1 to about 40 volumes of diafiltration solution, preferably about 2 to about 25 volumes of diafiltration solution. In the diafiltration operation, further quantities of contaminants are removed from the aqueous pulse protein solution by passage through the membrane with the permeate. This purifies the aqueous protein solution and may also reduce its viscosity. The diafiltration operation may be effected until no significant further quantities of contaminants and visible colour are present in the permeate or until the retentate has been sufficiently purified so as, when pH adjusted, optionally further processed then dried, to provide a pulse protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 1,000 to about 1,000,000 Daltons, preferably about 1,000 to about 100,000 Daltons, having regard to different membrane materials and configuration.

Alternatively, the diafiltration step may be applied to the acidified aqueous protein solution prior to concentration or to partially concentrated acidified aqueous protein solution. Diafiltration may also be applied at multiple points during the concentration process. When diafiltration is applied prior to concentration or to the partially concentrated solution, the resulting diafiltered solution may then be additionally concentrated. The viscosity reduction achieved by diafiltering multiple times as the protein solution is concentrated may allow a higher final, fully concentrated protein concentration to be achieved.

The concentration step and the diafiltration step may be effected herein in such a manner that the pulse protein product subsequently recovered contains less than about 90 wt % protein (N×6.25) d.b., such as at least about 60 wt % protein (N×6.25) d.b. By partially concentrating and/or partially diafiltering the aqueous pulse protein solution, it is possible to only partially remove contaminants. This protein solution may then be pH adjusted, optionally further processed as described below and dried to provide a pulse protein product with lower levels of purity.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the pulse protein solution.

The optional concentration step and the optional diafiltration step may be effected at any convenient temperature, generally about 2° to about 65° C., preferably about 50° to about 60° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As alluded to earlier, pulses contain anti-nutritional trypsin inhibitors. The level of trypsin inhibitor activity in the final pulse protein product can be controlled by the manipulation of various process variables.

As noted above, heat treatment of the acidified aqueous pulse protein solution may be used to inactivate heat-labile trypsin inhibitors. The partially concentrated or fully concentrated acidified aqueous pulse protein solution may also be heat treated to inactivate heat labile trypsin inhibitors. When the heat treatment is applied to the partially concentrated acidified pulse protein solution, the resulting heat treated solution may then be additionally concentrated.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as 30,000 to 1,000,000 Da, operating the membrane at elevated temperatures, such as about 30° to about 65° C., preferably about 50° to about 60° C. and employing greater volumes of diafiltration medium, such as 10 to 40 volumes.

Acidifying and membrane processing the pulse protein solution at a lower pH, such as 1.5 to 3, may reduce the trypsin inhibitor activity relative to processing the solution at higher pH, such as 3 to 4.4. Further, a reduction in trypsin inhibitor activity may be achieved by exposing pulse materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the pulse protein source material in the extraction step, may be added to the clarified aqueous pulse protein solution following removal of residual pulse protein source material, may be added to the diafiltered retentate before or after pH adjustment or may be dry blended with the dried pulse protein product. The addition of the reducing agent may be combined with the heat treatment step and membrane processing steps, as described above.

If it is desired to retain active trypsin inhibitors in the protein solution, this can be achieved by eliminating or reducing the intensity of the heat treatment step, not utilizing reducing agents, operating the optional concentration and optional diafiltration steps at the higher end of the pH range, such as 3 to 4.4, utilizing a concentration and diafiltration membrane with a smaller pore size, operating the membrane at lower temperatures and employing fewer volumes of diafiltration medium.

The optionally concentrated and optionally diafiltered protein solution may be subject to a further defatting operation, if required, as described in U.S. Pat. Nos. 5,844,086 and 6,005,076. Alternatively, defatting of the optionally concentrated and optionally diafiltered protein solution may be achieved by any other convenient procedure.

The optionally concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the protein solution. For powdered activated carbon, an amount of about 0.025% to about 5% w/v, preferably about 0.05% to about 2% w/v, is employed. The adsorbent may be removed from the pulse protein solution by any convenient means, such as by filtration.

A pasteurization step may be effected on the pulse protein solution prior to pH adjustment. Such pasteurization may be effected under any desired pasteurization conditions. Generally, the optionally concentrated and optionally diafiltered pulse protein solution is heated to a temperature of about 55° to about 70° C., preferably about 60° to about 65° C., for about 30 seconds to about 60 minutes, preferably about 10 minutes to about 15 minutes. Alternatively, such pasteurization may be carried out at about 70 to about 85° C. for about 10 to about 60 seconds. The pasteurized pulse protein solution may then be cooled for further processing, preferably to a temperature of about 25° to about 40° C.

A variety of procedures may be used to provide the pH adjusted pulse protein product according to the invention from the acid soluble pulse protein product and to manipulate the functional properties thereof.

In one such procedure, the acidified aqueous pulse protein solution, the partially concentrated pulse protein solution or the concentrated pulse protein solution described above, following optional dilution with about 0.1 to about 6 volumes of water, preferably about 1 to about 4 volumes of water, may be adjusted to a pH about 6 to about 8, preferably about 6.5 to about 7.5. The entire sample then may be dried or any precipitated solids may be collected by centrifugation and only these dried to form the product. Alternatively, the pH 6 to 8 solution may be heated to a temperature of about 70° to about 160° C., for about 2 seconds to about 60 minutes, preferably about 80° to about 120° C., for about 15 seconds to about 15 minutes, more preferably about 85° to about 95° C., for about 1 to about 5 minutes, prior to drying the entire sample or collecting any precipitated solids by centrifugation and drying these to form the product.

As a further alternative, the acidified aqueous pulse protein solution may be adjusted in pH to about 6 to about 8, preferably about 6.5 to about 7.5 prior to the optional concentration and optional diafiltration steps above. The pH adjusted protein solution resulting from the optional concentration and optional diafiltration steps may then be dried or centrifuged to collect any insoluble pulse protein material, which may be dried. Alternatively, the pH adjusted protein solution resulting from the optional concentration and optional diafiltration steps may be heat treated and then dried or centrifuged to collect any insoluble pulse protein material, which may be dried.

Alternatively, the acidified aqueous pulse protein solution, optionally processed as described above, is dried without any pH adjustment. The dried pulse protein product then may be redissolved in water and the pH of the resulting acidic aqueous solution is raised to a pH of about 6 to about 8, preferably 6.5 to about 7.5, in any convenient manner, such as by the use of aqueous sodium hydroxide solution, prior to drying. Alternatively, any precipitate formed on adjustment of the pH to about 6 to about 8 is recovered by centrifugation and these solids are dried to yield a pulse protein product.

As a further alternative, the pH 6 to 8 solution may be heated to a temperature of about 70° C. to about 160° C., for about 2 seconds to about 60 minutes, preferably about 80° to about 120° C., for about 15 seconds to about 15 minutes, more preferably about 85° to about 95° C., for about 1 to about 5 minutes, prior to drying the entire sample, or in yet another alternative procedure, recovering by centrifugation and drying only any insoluble solids present in the heat treated sample.

The dry pulse protein product has a protein content of at least about 60 wt % (N×6.25) d.b. Preferably, the dry pulse protein product is an isolate with a high protein content, in excess of about 90 wt % protein, preferably at least about 100 wt % protein (N×6.25) d.b.

In the procedures in which precipitated solids are collected and dried, the remaining soluble protein fraction may also be processed to form a pulse protein product. The soluble fraction may be dried directly or may be further processed by membrane concentration and/or diafiltration and/or heat treatment prior to drying.

EXAMPLES

Example 1

This Example illustrates the preparation of pH adjusted pea protein isolates.

30 kg of pea protein concentrate, prepared by air classifying flour made by grinding yellow split peas, was added to 300 L of 0.15 M $CaCl_2$ solution at ambient temperature and agitated for 30 minutes to provide an aqueous protein solution. The residual solids were removed by centrifugation to produce 262 L of centrate having a protein content of 3.47% by weight. This centrate was added to 317 L of water and the pH of the sample lowered to 3.27 with HCl that had been diluted with an equal volume of water. The diluted and acidified centrate was further clarified by filtration to provide a protein solution with a protein content of 1.23% by weight.

The filtered protein solution was reduced in volume from 583 L to 60 L by concentration on a PES membrane, having a molecular weight cutoff of 10,000 Daltons, operated at a temperature of about 56° C. At this point the acidified protein solution, with a protein content of 10.14% by weight, was diafiltered with 600 L of RO water, with the diafiltration operation conducted at about 59° C. The resulting diafiltered solution had a weight of 58.36 kg and a protein content of 9.16% by weight.

A 18.86 kg sample of the concentrated protein solution, which represented a yield of 24.1% of the filtered protein solution, was diluted with 18.92 kg of water and then treated with an aqueous sodium hydroxide solution to raise the pH of the sample to 7.00 and a precipitate formed. A 1 kg aliquot of the pH adjusted sample was centrifuged at 6,500 g and the precipitate collected and freeze dried to form a product called YP03-L07-11A YP701N having a protein content of 106.33 wt % (N×6.25) on a dry weight basis. The remainder of the pH adjusted sample was spray dried and then freeze dried to further reduce the moisture content and to form a product called YP03-L07-11A YP701N2 having a protein content of 102.02 wt % (N×6.25) on a dry weight basis.

Example 2

This Example is another illustration of the preparation of a pH adjusted pea protein isolate.

46.3 kg of yellow split pea flour was combined with 300 L of reverse osmosis (RO) purified water at 30° C. and agitated for 30 minutes. 4.53 kg of calcium chloride pellets (95.5%) were added and the mixture stirred for an additional 15 minutes. The residual solids were removed by centrifugation to produce 264 L of centrate having a protein content of 1.94% by weight. 264 L of centrate was added to 185 L of RO water and the pH of the sample lowered to 2.99 with HCl that had been diluted with an equal volume of water. The diluted and acidified centrate was further clarified by filtration to provide a protein solution with a protein content of 0.95% by weight.

The filtered protein solution was reduced in volume from 470 L to 66 L by concentration on a polyethersulfone (PES) membrane, having a molecular weight cutoff of 10,000 Daltons, operated at a temperature of approximately 58° C. At this point the protein solution, with a protein content of 4.75 wt %, was diafiltered with 132 L of RO water, with the diafiltration operation conducted at approximately 59° C. The diafiltered protein solution was then concentrated to 28 L and diafiltered with an additional 140 L of RO water, with the diafiltration operation conducted at approximately 60° C. The concentrated protein solution, having a protein content of 10.13 wt % was diluted with RO water to a protein content of 4.58 wt %. 28.1 kg of this solution, representing a yield of 28.9 wt % of the filtered protein solution, was then adjusted in pH to 6.93 with NaOH solution. The pH adjusted protein solution was then spray dried to yield a product found to have a protein content of 98.72 wt % (N×6.25) d.b. The product was given designation YP07-C20-12A YP701N2.

Example 3

This Example contains an evaluation of the solubility in water of the pea protein isolates produced by the methods of Examples 1 and 2. Protein solubility was evaluated using a modified version of the procedure of Morr et al., J. Food Sci. 50:1715-1718.

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (6, 6.5, 7, 7.5 or 8) with diluted NaOH or HCl. The pH was measured and corrected periodically during the 60 minutes stirring. After the 60 minutes of stirring, the samples were made up to 50 ml total volume with RO water yielding a 1% protein w/v dispersion. The protein content of the dispersions was measured by combustion analysis using a Leco Nitrogen Determinator. Aliquots of the dispersions were then centrifuged at 7,800 g for 10 minutes, which sedimented insoluble material and yielded a supernatant. The protein content of the supernatant was measured by combustion analysis and the protein solubility of the product was then calculated as follows:

Solubility (%)=(% protein in supernatant/% protein in initial dispersion)×100.

The solubility results are set forth in the following Table 1.

TABLE 1

Solubility of products at different pH values

| Product | Solubility (%) | | | | |
|---|---|---|---|---|---|
| | pH 6 | pH 6.5 | pH 7 | pH 7.5 | pH 8 |
| YP03-L07-11A YP701N | 1.2 | 16.1 | 8.3 | 8.3 | 2.6 |
| YP03-L07-11A YP701N2 | 17.1 | 16.9 | 22.5 | 26 | 25.9 |
| YP07-C20-12A YP701N2 | 8.6 | 19.9 | 11.4 | 20.9 | 21.4 |

As may be seen from the results in Table 1, the protein isolates were poorly soluble in the pH range 6 to 8.

Example 4

This Example contains an evaluation of the water binding capacity of the pea protein isolates produced by the methods of Examples 1 and 2.

Protein powder (1 g) was weighed into centrifuge tubes (50 ml) of known weight. To this powder was added approximately 20 ml of reverse osmosis purified (RO) water at the natural pH. The contents of the tubes were mixed using a vortex mixer at moderate speed for 1 minute. The samples were incubated at room temperature for 5 minutes then mixed with the vortex mixer for 30 seconds. This was followed by incubation at room temperature for another 5 minutes followed by another 30 seconds of vortex mixing. The samples were then centrifuged at 1,000 g for 15 minutes at 20° C. After centrifugation, the supernatant was carefully poured off, ensuring that all solid material remained in the tube. The centrifuge tube was then re-weighed and the weight of water saturated sample was determined.

Water binding capacity (WBC) was calculated as:

WBC(ml/g)=(mass of water saturated sample−mass of initial sample)/(mass of initial sample×total solids content of sample)

The water binding capacity results obtained are set forth in the following Table 2.

TABLE 2

Water binding capacity of various products

| product | WBC (ml/g) |
|---|---|
| YP03-L07-11A YP701N | 4.10 |
| YP03-L07-11A YP701N2 | 2.72 |
| YP07-C20-12A YP701N2 | 2.74 |

As may be seen from the results of Table 2, capture of just the insoluble protein fraction resulted in a product with a higher water binding capacity.

Example 5

This Example contains an evaluation of the phytic acid content of the protein products prepared as described in Examples 1 and 2. Phytic acid content was determined using the method of Latta and Eskin (J. Agric. Food Chem., 28: 1313-1315). The YP03-L07-11A YP701N2 was tested after spray drying but prior to the freeze drying step.

The results obtained are set forth in the following Table 3.

TABLE 3

Phytic acid content of protein products

| product | % phytic acid d.b. |
|---|---|
| YP03-L07-11A YP701N | 0.03 |
| YP03-L07-11A YP701N2 | 0.07 |
| YP07-C20-12A YP701N2 | 0.00 |

As may be seen from the results in Table 3, all of the products tested were very low in phytic acid.

Example 6

This Example illustrates the preparation of a pulse protein isolate by conventional isoelectric precipitation.

20 kg of yellow pea protein concentrate was added to 200 L of RO water at ambient temperature and the pH adjusted to about 8.5 by the addition of sodium hydroxide solution. The sample was agitated for 30 minutes to provide an aqueous protein solution. The pH of the extraction was monitored and maintained at about 8.5 throughout the 30 minutes. The residual pea protein concentrate was removed and the resulting protein solution clarified by centrifugation and filtration to produce 240 L of filtered protein solution having a protein content of 3.52% by weight. The pH of the protein solution was adjusted to about 4.5 by the addition of HCl that had been diluted with an equal volume of water and a precipitate formed. The precipitate was collected by centrifugation then washed by re-suspending it in 2 volumes of RO water. The washed precipitate was then collected by centrifugation. A total of 30.68 kg of washed precipitate was obtained with a protein content of 22.55 wt %. This represented a yield of 81.9% of the protein in the clarified extract solution. An aliquot of 15.34 kg of the washed precipitate was combined with 15.4 kg of RO water and then the pH of the sample adjusted to about 7 with sodium hydroxide solution. The pH adjusted sample was then spray dried to yield an isolate with a protein content of 90.22% (N×6.25) d.b. The product was designated YP12-K13-12A conventional IEP pH 7.

Example 7

This Example is a sensory evaluation of the YP03-L07-12A YP701N product prepared as described in Example 1 with the conventional pea protein isolate product prepared as described in Example 6.

Samples were presented for sensory evaluation as a 2% protein w/v dispersion in purified drinking water. A small amount of food grade sodium hydroxide solution was incorporated when preparing the samples so that the pH of each was 7. Samples were presented blindly to an informal panel of 7 panelists who were asked to identify which sample had a cleaner flavour and which sample they preferred the flavour of.

Seven out of seven panelists found the YP03-L07-12A YP701N to have cleaner flavour than the YP12-K13-12A conventional IEP pH 7 and all seven panelists preferred the flavour of the YP03-L07-12A YP701N.

Example 8

This Example is a sensory evaluation of the YP03-L07-12A YP701N2 product prepared as described in Example 1 with the conventional pea protein isolate product prepared as described in Example 6.

Samples were presented for sensory evaluation as a 2% protein w/v dispersion in purified drinking water. A small amount of food grade sodium hydroxide solution was incorporated when preparing the samples so that the pH of each was 7. Samples were presented blindly to an informal panel of 7 panelists who were asked to identify which sample had a cleaner flavour and which sample they preferred the flavour of.

Five out of seven panelists found the YP03-L07-12A YP701N2 to have cleaner flavour than the YP12-K13-12A conventional IEP pH 7 and five out of seven panelists preferred the flavour of the YP03-L07-12A YP701N2.

Example 9

This Example is a sensory evaluation of the YP07-C20-12A YP701N2 product prepared as described in Example 2 with the conventional pea protein isolate product prepared as described in Example 6.

Samples were presented for sensory evaluation as a 2% protein w/v dispersion in purified drinking water. A small amount of food grade sodium hydroxide solution was incorporated when preparing the samples so that the pH of each was 7. Samples were presented blindly to an informal panel of 6 panelists who were asked to identify which sample had a cleaner flavour and which sample they preferred the flavour of.

All six panelists found the YP07-C20-12A YP701N2 to have cleaner flavor than the YP12-K13-12A conventional IEP pH 7 and all six panelists preferred the flavour of the YP03-L07-12A YP701N2.

Example 10

This Example describes the production of a dairy alternative beverage using the product of Example 2 or Nutralys S85F (Roquette America Inc., Keokuk, Iowa), a commercial pea protein isolate recommended for use in applications including dairy-type products.

The formulations of the products are shown in Table 4. Note each product was formulated to contain 2% protein. The as-is basis protein content of the YP07-C20-12A YP701N2 was 90.90% and that of the Nutralys S85F was 78.52%.

TABLE 4

Dairy alternative beverage formulations

| ingredient | YP07-C20-12A YP701N2 formulation | | Nutralys S85F formulation | |
| --- | --- | --- | --- | --- |
| | weight (g) | % | weight (g) | % |
| YP07-C20-12A YP701N2 | 8.80 | 2.2 | 0 | 0 |
| Nutralys S85F | 0 | 0 | 10.19 | 2.55 |
| Carrageenan | 0.04 | 0.01 | 0.04 | 0.01 |
| Gellan gum | 0.2 | 0.05 | 0.2 | 0.05 |
| Sugar | 18 | 4.5 | 18 | 4.5 |
| Natural dairy flavor enhancer | 1 | 0.25 | 1 | 0.25 |
| Natural vanilla WONF | 1.2 | 0.3 | 1.2 | 0.3 |
| vitamin and mineral pre-mix | 3.08 | 0.77 | 3.08 | 0.77 |
| water | 359.68 | 89.92 | 358.29 | 89.57 |
| canola oil | 8 | 2 | 8 | 2 |
| Total | 400 | 100 | 400 | 100 |

The protein powder, sugar (Rogers Fine Granulated, Lantic Inc., Montreal, QC), carrageenan (Genuvisco J-DS, C. P. Kelco, Lille Skensved, Denmark) and gellan gum (Kelcogel HS-B, CP Kelco, Atlanta Ga.) were dry blended. The dry ingredients were combined with the water, dairy flavor enhancer (33726, Comax Flavors, Melville, N.Y.) and vanilla (19667, Comax Flavors, Melville, N.Y.) and mixed until fully dissolved. The canola oil (Canada Safeway, Calgary, AB) and vitamin and mineral pre-mix (FT132894, Fortitech, Schenectady, N.Y.) were added and then the pH of the system adjusted to 7.25 with food grade NaOH or HCl solution as necessary. The sample was pasteurized at 80° C. for 30 seconds and then homogenized with 400 bar pressure on the first stage and 40 bar on the second stage. The product was then cooled and stored under refrigeration until used for sensory testing.

Example 11

This Example is a sensory evaluation of the dairy alternative beverages produced in Example 10.

Samples were presented blindly to an informal panel of 8 panelists who were asked to identify which sample had a cleaner flavour and which sample they preferred the flavour of.

Six out of eight panelists indicated that the dairy alternative beverage prepared with YP07-C20-12A YP701N2 had a cleaner flavor than the beverage prepared with Nutralys S85F. Five out of eight panelists preferred the beverage prepared with YP07-C20-12A YP701N2.

Example 12

This Example is another illustration of the preparation of pH adjusted pea protein isolates.

'a' kg of yellow pea 'b' was combined with 'c' L of reverse osmosis (RO) purified water and the mixture stirred for 'd' minutes at ambient temperature. The bulk of the residual solids were removed by centrifugation using a decanter centrifuge, yielding a protein solution having a protein concentration of 'e' wt %. To this protein solution was added 'f' kg of calcium chloride stock solution, prepared by dissolving 'g' kg calcium chloride pellets (95.5%) in 'h' L water. The mixture was stirred for 'i' minutes then 'j' g of anti-foam added. The fine residual solids were removed by centrifugation using a disc stack centrifuge to produce 'k' L of centrate having a protein content of 'l' % by weight and a conductivity of 'm' mS. 'n' L of centrate was combined with 'o' L of RO water and the pH of the sample lowered to 'p' with HCl that had been diluted with an equal volume of water. 'q' L of acidified protein solution was clarified using a Membralox ceramic microfiltration membrane, having a pore size of 0.80 μm, operated at about 'r'° C. until 's' L of permeate (clarified, acidified protein solution) was collected.

The 't' protein solution, having a protein content of 'u' wt % was reduced in volume from 'v' L to 'w' L by concentration on a polyethersulfone (PES) membrane, having a molecular weight cutoff of 1,000 daltons, operated at a temperature of approximately 'x'° C. At this point the protein solution, with a protein content of 'y' wt % was diafiltered with 'z' L of RO water, with the diafiltration operation conducted at approximately 'aa'° C. The diafiltered protein solution was then concentrated to 'ab' kg at about 'ac'° C. The concentrated protein solution, having a protein content of 'ad' wt % represented a yield of 'ae' wt % of the 't' protein solution. 'af' kg of the concentrated protein solution was diluted with 'ag' L RO water and then adjusted in pH to 'ah' with 'ai' solution and then an aliquot spray dried to yield a product found to have a protein content of 'aj' wt % (N×6.25) d.b. The product was given designation 'ak' YP701N2.

Values for parameters 'a' to 'ak' are shown in Table 5

TABLE 5

Parameters for the production of the pH adjusted pea protein isolates

| ak | YP18-E30-13A | YP18-K18-13A | YP23-A09-14A | YP23-A13-14A |
|---|---|---|---|---|
| a | 267.13 | 96 | 36 | 36 |
| b | flour | flour | protein concentrate | protein concentrate |
| c | 2002.4 | 600 | 600 | 600 |
| d | 30 | 10 | 10 | 10 |
| e | 1.75 | 2.86 | 3.11 | 3.34 |
| f | 250 | 68.3 | 81.0 | 80 |
| g | 30 | 10 | 9 | 9 |
| h | 270 | 90 | 80 | 80 |
| i | not recorded | 10 | 10 | 10 |
| j | not applicable | 2 | 2 | not applicable |
| k | 1885.3 | 475.7 | 617 | 505.5 |
| l | 0.98 | 1.44 | 1.58 | 1.76 |
| m | 20.3 | 20.3 | 21.3 | 21.0 |
| n | 1885.3 | 475.7 | 617 | 505.5 |
| o | about 1275 | 318.6 | 411 | 414.5 |
| p | 3.08 | 3.63 | 2.99 | 2.81 |
| q | about 2205 | 787 | 1045 | not applicable |
| r | 59 | 60 | 59 | not applicable |
| s | 1805 | 730 | 1015 | not applicable |
| t | clarified, acidified | clarified, acidified | clarified, acidified | acidified |
| u | 0.52 | 0.67 | 0.94 | 1.01 |
| v | 1805 | 730 | 1015 | 950 |
| w | 135 | 75 | 162 | 170 |
| x | 52 | 53 | 58 | 60 |
| y | 5.08 | 4.78 | 5.24 | 5.02 |

TABLE 5-continued

Parameters for the production of the pH adjusted pea protein isolates

| ak | YP18-E30-13A | YP18-K18-13A | YP23-A09-14A | YP23-A13-14A |
|---|---|---|---|---|
| z | 270 | 375 | 324 | 340 |
| aa | 56 | 60 | 60 | 60 |
| ab | 72.04 | 27.32 | 78.80 | 76.12 |
| ac | 55 | 62 | 60 | 60 |
| ad | 11.41 | 10.04 | not recorded | 10.10 |
| ae | 87.5 | 56.0 | not determined | 80.1 |
| af | about 39.45 | not recorded | not recorded | not recorded |
| ag | about 68.75 | not applicable | not applicable | not applicable |
| ah | 6.87 | 7.13 | 7.56 | 7.07 |
| ai | NaOH | NaOH/KOH | NaOH/KOH | NaOH/KOH |
| aj | 96.00 | 96.81 | 94.20 | 94.56 |

Example 13

This Example is another illustration of the preparation of pH adjusted pea protein isolates.

36 kg of yellow pea protein concentrate was combined with 600 L of RO water at ambient temperature and agitated for 10 minutes. The bulk of the residual solids were removed by centrifugation using a decanter centrifuge, yielding a protein solution having a protein concentration of 'a' wt %. To this protein solution was added 'b' kg of a calcium chloride stock solution prepared by dissolving 1 kg of calcium chloride pellets (95.5%) per 17.2 L of RO water and the mixture stirred. The fine residual solids were removed by centrifugation using a disc stack centrifuge to produce a centrate. 'c' L of centrate was combined with 'd' L of RO water at ambient temperature and the pH of the sample lowered to 'e' with HCl that had been diluted with an equal volume of water.

The acidified protein solution, having a protein content of 'f' % by weight, was reduced in volume from 'g' L to 'h' L by concentration on a polyethersulfone membrane, having a molecular weight cut-off of 1,000 daltons, operated at a temperature of about 'i' ° C. At this point the protein solution, with a protein content of 'j' wt % was diafiltered with 'k' L of RO water, with the diafiltration operation conducted at about 'l' ° C. The diafiltered protein solution was then further concentrated to 'm' L, the resulting protein solution having a protein content of 'n' wt %, represented a yield of 'o' wt % of the acidified protein solution. The concentrated and diafiltered protein solution was pasteurized at about 72° C. for 16 seconds then 'p' kg of the pasteurized, concentrated and diafiltered protein solution was diluted with 'q' L of RO water and adjusted in pH to 'r' with NaOH/KOH solution. 's' of the pH adjusted sample was then spray dried to yield a product found to have a protein content of 't' wt % (N×6.25) d.b. The product was given designation 'u' YP701N2. The parameters 'a' to are set forth in the following Table 6.

TABLE 6

Parameters for the production of the pH adjusted pea protein isolates

| u | YP27-E04-15A | YP27-E11-15A |
|---|---|---|
| a | 2.43 | 2.59 |
| b | 137.50 | 142.84 |
| c | 650 | 664 |
| d | 432 | 431 |
| e | 2.90 | 3.13 |
| f | 0.62 | 0.68 |
| g | 1110 | 1097 |

TABLE 6-continued

Parameters for the production of the pH adjusted pea protein isolates

| u | YP27-E04-15A | YP27-E11-15A |
|---|---|---|
| h | 110 | 145 |
| i | 59 | 58 |
| j | 4.91 | 4.69 |
| k | 220 | 290 |
| l | 59 | 60 |
| m | 44 | 57 |
| n | 10.10 | 11.00 |
| o | 64.5 | 84.0 |
| p | 45.16 | 51.36 |
| q | 2.64 | 24.34 |
| r | 7.75 | 7.27 |
| s | all | a portion |
| t | 96.91 | 96.14 |

Example 14

This Example contains an evaluation of the phytic acid content of protein products produced as described in Examples 12 and 13. Phytic acid content was determined using the method of Latta and Eskin (J. Agric. Food Chem., 28: 1313-1315).

The results obtained are set forth in the following Table 7.

TABLE 7

Phytic acid content of protein products

| product | % phytic acid d.b. |
|---|---|
| YP18-E30-13A YP701N2 | 0.00 |
| YP18-K18-13A YP701N2 | 0.16 |
| YP23-A13-14A YP701N2 | 0.03 |
| YP27-E04-15A YP701N2 | 0.13 |
| YP27-E11-15A YP701N2 | 0.10 |

As may be seen from the results presented in Table 7, the pulse protein products prepared as described in Examples 12 and 13 were very low in phytic acid content.

Example 15

This Example illustrates the molecular weight profile of the pulse protein products prepared as described in Examples 1, 2 and 12 as well as the molecular weight profile of some commercial yellow pea protein products (Pisane C9 (Cosucra Groupe Warcoing S.A., Belgium), Pea Protein YS 85% (The Scoular Company, Minneapolis, Minn. (manufactured by Yantai Shuangta Food Co., LTD, Jinling Town, Zhaoyuan City, Shangdong Province, China) and Empro E86 (Emsland Group, Emlichheim, Germany). These protein products are among the most highly purified pea protein ingredients currently commercially available.

Molecular weight profiles were determined by size exclusion chromatography using a Varian ProStar HPLC system equipped with a 300×7.8 mm Phenomenex BioSep S-2000 series column. The column contained hydrophilic bonded silica rigid support media, 5 micron diameter, with 145 Angstrom pore size.

Before the pulse protein samples were analyzed, a standard curve was prepared using a Biorad protein standard (Biorad product #151-1901) containing proteins with known molecular weights between 17,000 Daltons (myoglobulin) and 670,000 Daltons (thyroglobulin) with Vitamin B12 added as a low molecular weight marker at 1,350 Daltons.

A 0.9% w/v solution of the protein standard was prepared in water, filtered with a 0.45 μm pore size filter disc then a 50 μL aliquot run on the column using a mobile phase of 0.05M phosphate/0.15M NaCl, pH 6 containing 0.02% sodium azide. The mobile phase flow rate was 1 mL/min and components were detected based on absorbance at 280 nm. Based on the retention times of these molecules of known molecular weight, a regression formula was developed relating the natural log of the molecular weight to the retention time in minutes.

Retention time (min)=−0.955×ln (molecular weight)+ 18.502 ($r^2$=0.999)

For the analysis of the pulse protein samples, 0.05M NaCl, pH 3.5 containing 0.02% sodium azide was used as the mobile phase and also to dissolve dry samples. Protein samples were mixed with mobile phase solution to a concentration of 1% w/v, placed on a shaker for at least 1 hour then filtered using 0.45 μm pore size filter discs. Sample injection size was 50 μL. The mobile phase flow rate was 1 mL/minute and components were detected based on absorbance at 280 nm.

The above regression formula relating molecular weight and retention time was used to calculate retention times that corresponded to molecular weights of 100,000 Da, 15,000 Da, 5,000 Da and 1,000 Da. The HPLC ProStar system was used to calculate the peak areas lying within these retention time ranges and the percentage of protein ((range peak area/total protein peak area)×100) falling in a given molecular weight range was calculated. Note that the data was not corrected by protein response factor.

The molecular weight profiles of the products prepared as described in Examples 1, 2 and 12 and the commercial products are shown in Table 8.

TABLE 8

Molecular weight profile of pulse protein products

| product | % >100,000 Da | % 15,000- 100,000 Da | % 5,000- 15,000 Da | % 1,000- 5,000 Da |
|---|---|---|---|---|
| YP03-L07-11A YP701N | 27.0 | 49.4 | 11.8 | 11.9 |
| YP03-L07-11A YP701N2 | 21.8 | 47.6 | 14.7 | 15.9 |
| YP07-C20-12A YP701N2 | 31.2 | 45.9 | 11.2 | 11.8 |
| YP18-E30-13A YP701N2 | 24.4 | 25.0 | 32.8 | 17.8 |
| YP18-K18-13A YP701N2 | 32.1 | 27.9 | 26.2 | 13.8 |
| YP23-A09-14A YP701N2 | 23.1 | 26.1 | 36.4 | 14.4 |
| YP23-A13-14A YP701N2 | 24.3 | 25.5 | 36.8 | 13.4 |
| Pisane C9 | 8.2 | 38.4 | 13.8 | 39.6 |
| Pea Protein YS 85% | 0 | 24.3 | 3.3 | 72.4 |
| Empro E86 | 0 | 14.5 | 1.0 | 84.5 |

As may be seen from the results presented in Table 8, the molecular weight profiles of the products prepared according to Examples 1, 2 and 12 were different from the molecular weight profiles of the commercial yellow pea protein products.

Example 16

This Example contains an evaluation of the colour in solution and the haze level of solutions of the pulse products prepared according Examples 1, 2, 12 and 13 as well as the commercial pea protein products Propulse (Nutri-Pea, Portage la Prairie, MB), Nutralys S85F (Roquette America, Inc., Keokuk, Iowa), Pisane C9 (Cosucra Groupe Warcoing, S.A., Belgium), Pea Protein YS 85% (The Scoular Company, Minneapolis, Minn. (manufactured by Yantai Shuangta Food Co., LTD, Jinling Town, Zhaoyuan City, Shangdong Province, China), HarvestPro Pea Protein 85 (Glanbia Nutritionals, Inc., Fitchburg, Wis.) and Empro E86 (Emsland Group, Emlichheim, Germany). Solutions of the protein products were prepared by dissolving sufficient protein powder to supply 0.48 g of protein in 15 ml of RO water. The pH of the solutions was measured with a pH meter and the colour and haze level assessed using a HunterLab ColorQuest XE instrument operated in transmission mode. The results are shown in the following Table 9.

TABLE 9

Colour and haze values for samples in solution

| product | pH | L* | a* | b* | % haze |
|---|---|---|---|---|---|
| YP03-L07-11A YP701N2 | 6.63 | 49.78 | 2.48 | 24.03 | 94.9 |
| YP07-C20-12A YP701N2 | 6.56 | 46.63 | 3.63 | 26.81 | 95.7 |
| YP18-E30-13A YP701N2 | 7.08 | 44.49 | 5.84 | 31.99 | 96.5 |
| YP18-K18-13A YP701N2 | 7.16 | 57.23 | 3.92 | 23.92 | 98.1 |
| YP23-A09-14A YP701N2 | 7.35 | 39.53 | 6.78 | 30.52 | 96.1 |
| YP23-A13-14A YP701N2 | 7.37 | 44.04 | 4.34 | 29.39 | 95.9 |
| YP27-E04-15A YP701N2 | 7.86 | 51.79 | 2.74 | 25.79 | 97.2 |
| YP27-E11-15A YP701N2 | 7.37 | 50.46 | 3.32 | 26.49 | 98.1 |
| Pisane C9 | 7.68 | 45.04 | 8.57 | 47.57 | 98.8 |
| Nutralys S85F | 7.32 | 53.48 | 6.20 | 34.01 | 97.5 |
| Propulse | 6.15 | 35.33 | 12.61 | 48.79 | 96.6 |
| Pea Protein YS 85% | 7.16 | 41.74 | 11.11 | 43.51 | 97.9 |
| HarvestPro Pea Protein 85 | 7.17 | 37.80 | 12.37 | 42.12 | 97.7 |
| Empro E86 | 7.63 | 49.69 | 7.89 | 41.90 | 98.7 |

As may be seen from the results presented in Table 9, the solutions of the products prepared according to Examples 1, 2, 12 and 13 were generally less red and less yellow than the solutions of the commercial products.

Example 17

This Example contains an evaluation of the viscosity in solution of the pulse products prepared according Examples 12 and 13 as well as the commercial pea protein products Nutralys S85F (Roquette America, Inc., Keokuk, Iowa), HarvestPro Pea Protein 85 (Glanbia Nutritionals, Inc., Fitchburg, Wis.) and Empro E86 (Emsland Group, Emlichheim, Germany).

Sufficient protein powder to supply 40 g of protein was weighed into a 600 ml beaker. The protein powder was wetted by mixing with a portion of the water (about 150-200 g) and then additional water added to bring the sample weight to 400 g. The sample was stirred for 60 minutes to fully disperse/dissolve the protein powder and provide a 10% protein w/w solution. The viscosity of the protein solutions was measured at a temperature of about 23-26° C., using a Brookfield RVDV II+ viscometer equipped with spindles from the RV spindle set and a speed of 100 rpm used for the measurements. Each determination lasted for 90 seconds and viscosity readings were taken every 15 seconds after spindle rotation was started. The average of these values was taken as the sample viscosity. The pH of the samples was also determined. The results are shown in the following Table 10.

TABLE 10

Viscosity of 10% protein w/w solutions of pea protein product

| product | pH | viscosity (cP) |
|---|---|---|
| YP18-E30-13A YP701N2 | 6.83 | 20.9 |
| YP23-A09-14A YP701N2 | 7.28 | 20.0 |
| YP27-E04-15A YP701N2 | 7.58 | 25.9 |
| YP27-E11-15A YP701N2 | 7.11 | 22.6 |
| Nutralys S85F | 7.52 | 444.3 |
| Empro E86 | 7.18 | 182.3 |
| HarvestPro Pea Protein 85 | 6.79 | 146.8 |

As may be seen from the results presented in Table 10, the pulse protein products of the present invention provided 10% protein w/w solutions having lower viscosity than 10% protein w/w solutions of the commercial pulse protein products evaluated.

SUMMARY OF THE DISCLOSURE

In summary of this disclosure, the present invention provides procedures for producing pulse protein products with neutral or near neutral pH values that can substitute for conventional pulse protein products in a variety of food application. Modifications are possible within the scope of this invention.

What we claim is:

1. A pulse protein product having a protein content of at least about 60 wt % (N×6.25) d.b., a natural pH in aqueous solution of about 7.5 to about 8.0 of which has a phytic acid content of less than about 1.5 wt %.

2. The pulse protein product of claim 1 which has a protein content of at least about 90 wt % (N×6.25).

3. The pulse protein product of claim 2 which has a protein content of at least about 100 wt % (N×6.25).

4. The pulse protein product of claim 1 which has a phytic acid content of less than about 0.5 wt %.

5. The pulse protein product of claim 1 which is a yellow pea product.

6. A food composition comprising a pulse protein product as claimed in claim 1.

* * * * *